G. BARRY.
Improvement in Cigar Mould Presses.

No. 123,972. Patented Feb. 27, 1872.

Scale of one inch to one inch

Witnesses
C. C. Cook
Orin Judd

Inventor
George Barry,
By G. L. Chapin, Atty.

UNITED STATES PATENT OFFICE.

GEORGE BARRY, OF CHICAGO, ILLINOIS.

IMPROVEMENT IN CIGAR-MOLD PRESSES.

Specification forming part of Letters Patent No. 123,972, dated February 27, 1872.

SPECIFICATION.

I, GEORGE BARRY, of Chicago, in the county of Cook and State of Illinois, have invented a new and Improved Cigar-Mold Press, of which the following is a specification:

The present invention relates to a press of the rack form, which is used to clamp the two-part cigar-mold together when the cigars are being formed or cured; and its nature consists in combining vertical uprights with round horizontal bars and rollers, whereby the cigar-mold is readily clamped together and removed from the press.

Figure 1:
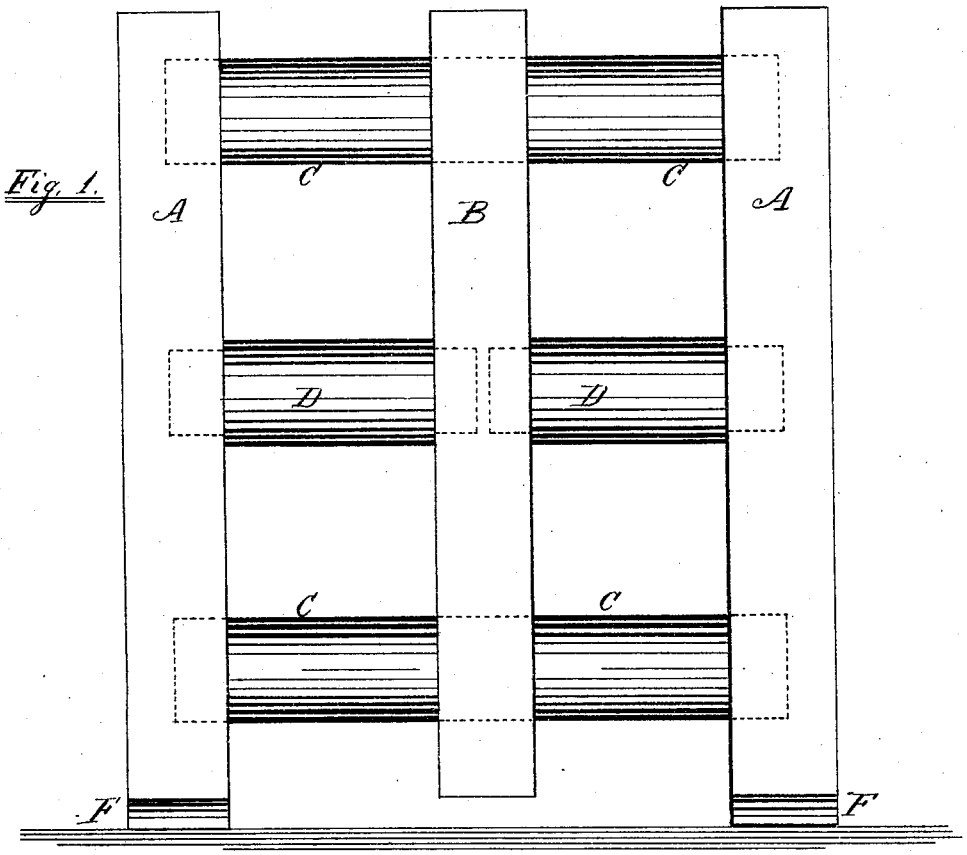
Figure 2:
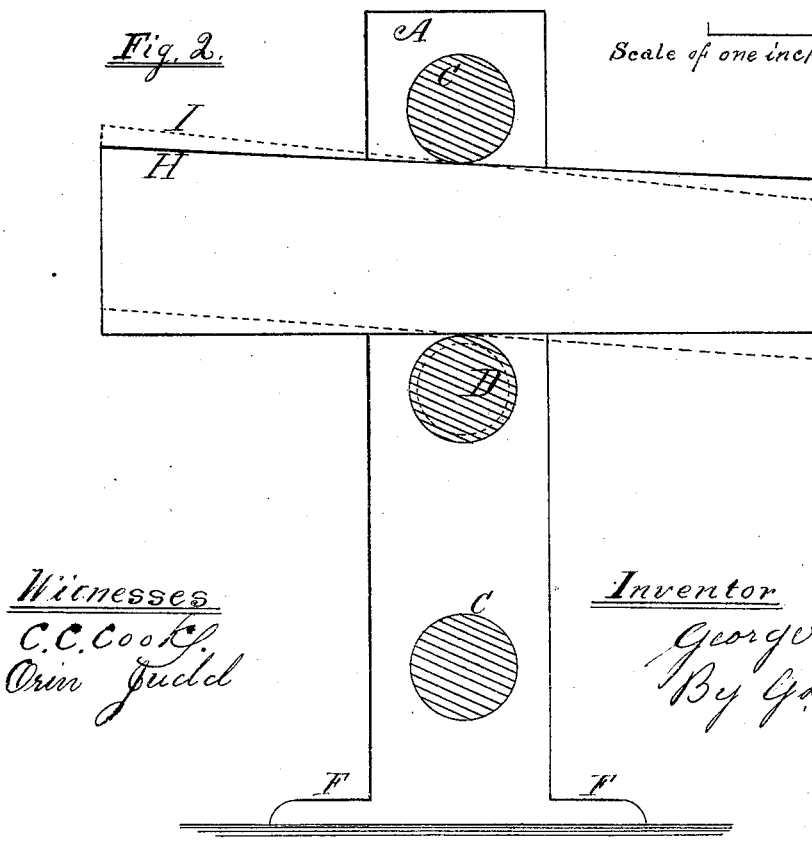

In the drawing, Figure 1 is a longitudinal elevation of my improved cigar-mold press. Fig. 2 is a vertical transverse section thereof, showing a cigar-mold in position as when being clamped together.

A A B represent vertical uprights, which support bars C and rollers D, only three uprights being shown; but any number may be used, according to the number of cigar-molds which a press is required to hold. C C represent round bars, which are put through the uprights A B, and which have such lengths as will give distances between uprights A B corresponding to the widths of the molds to be put in the press. Only bars C C and rollers D are shown, forming, with the uprights, four openings to receive cigar-molds, but any desired number may be used, according to the size of the press. The object of making the bars C C and rollers D round is that cigar-molds may be put into the press by hand and given a suitable pressure, and so that the molds may be readily removed by hand after the pressing is done.

To give an understanding of how easily the cigar-mold is put into and removed from the press, reference is made to Fig. 2. The cigar-mold is represented at H, and is first put into the press in an inclined position, as shown by dotted lines I, after which the large end is brought down to a level or below such a position, if required, to give the necessary pressure, the rods or bars C acting as fulcrums, while the rollers D roll and carry the wedge-shaped mold further through the press. By this means cigar-makers are enabled to handle cigar-molds rapidly enough to make their use profitable, inasmuch as all that is required to put the mold in is to bear gently against it while working the larger end up and down; and when the mold is to be removed or withdrawn from the press, to pull outward on it, also working the larger end up and down.

Having thus described my invention, what I claim, and desire to secure by Letters Patent, is—

The combination of the uprights A B with round bars C and round rollers D, substantially as and for the purpose set forth.

GEORGE BARRY.

Witnesses:
G. L. CHAPIN,
ORIN JUDD.